United States Patent
Burger et al.

(10) Patent No.: US 6,779,397 B2
(45) Date of Patent: Aug. 24, 2004

(54) DEVICE FOR DETERMINING THE FILLING LEVEL OF A FILLING MATERIAL IN A CONTAINER

(75) Inventors: Stefan Burger, Lüneburg/Ochtimissen (DE); Alexander Hardell, TA Rijswijk (NL)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/344,564
(22) PCT Filed: Jul. 28, 2001
(86) PCT No.: PCT/EP01/08761
§ 371 (c)(1), (2), (4) Date: Apr. 28, 2003
(87) PCT Pub. No.: WO02/16889
PCT Pub. Date: Feb. 28, 2002

(65) Prior Publication Data
US 2003/0167839 A1 Sep. 11, 2003

(30) Foreign Application Priority Data
Aug. 21, 2000 (DE) .......................................... 100 40 943

(51) Int. Cl.[7] ............................................. G01F 23/284
(52) U.S. Cl. .................... 73/290 V; 73/290 R; 340/612
(58) Field of Search .......................... 73/290 V, 290 R; 340/612, 552

(56) References Cited

U.S. PATENT DOCUMENTS

| | | | | |
|---|---|---|---|---|
| 4,566,321 A | * | 1/1986 | Zacchio | 73/290 R |
| 4,641,139 A | * | 2/1987 | Edvardsson | 342/124 |
| 5,333,493 A | | 8/1994 | Cutmore | 73/73 |
| 5,426,443 A | * | 6/1995 | Jenness, Jr. | 343/781 P |
| 6,353,418 B1 | * | 3/2002 | Burger et al. | 343/786 |
| 6,417,748 B1 | * | 7/2002 | Lopatin et al. | 333/252 |

\* cited by examiner

Primary Examiner—Hezron Williams
Assistant Examiner—Rodney T. Frank
(74) Attorney, Agent, or Firm—Bacon & Thomas

(57) ABSTRACT

The invention relates to a device for determining the filling level of a filling material in a container. The device has a signal-generating unit, which generates electromagnetic measuring signals, a transceiver unit, which emits the measuring signals via an antenna in the direction of the surface of the filling material and which receives the echo signals reflected at the surface of the filling material, the antenna comprising a waveguide which widens in the direction of emission into a cavity of a defined shape, and an evaluation unit which determines the filling level in the container from the propagation time of the measuring signals. At least one dielectric filling material is provided which at least partially fills up the waveguide, and which virtually completely fills up the widened cavity of the antenna.

10 Claims, 2 Drawing Sheets

DEVICE FOR DETERMINING THE FILLING LEVEL OF A FILLING MATERIAL IN A CONTAINER

FIELD OF THE INVENTION

The present invention relates to a device for determining the filling level of a filling material in a container.

The device has a signal-generating unit, which generates electromagnetic measuring signals, a transceiver unit, which emits the measuring signals via an antenna in the direction of the surface of the filling material and which receives the echo signals reflected at the surface of the filling material, the antenna comprising a waveguide which widens in the direction of emission into a cavity of a defined shape, and an evaluation unit which determines the filling level in the container from the propagation time of the measuring signals.

Devices of the above-named type preferably operate in the microwave region and are generally known under the name of microwave filling level measuring instruments. However, it is also possible in principle to operate the device according to the present invention with the aid of ultrasonic measuring signals.

The formation of sediments, what is termed deposition formation, in the antenna region is critical for all measuring instruments which determine the filling level of a filling material in a container via the propagation time of measuring signals. If a deposit, that is to say condensate and/or moisture as well as contamination of any sort, settles in the interior of the antenna, this has a direct influence on the propagation and the reflection behavior of the measuring signals: interference signals occur which are superimposed on the actual measuring signals and can become so strong as finally to render reliable filling level measurement impossible.

It has become known from the prior art to protect an antenna against deposit formation by means of what is termed a radome. A radome is a thin, film-like protective layer which is attached in the region of the outer edge of the antenna and prevents condensate and/or moisture from being able to penetrate into the interior of the antenna. The disadvantage of the radome is that because of its fragile configuration it has little resistance to high pressures. Its use in the field of process metrology is therefore relatively highly restricted.

It is an object of the present invention to provide a stable device for filling level measurement in the case of which deposit formation is excluded in particularly critical regions of the antenna such as for example the interior of the antenna.

The object is achieved by virtue of the fact that at least one dielectric filling material is provided which at least partially fills up the waveguide, and which virtually completely fills up the widened cavity of the antenna. The use of an insert made from a dielectric material renders it possible—if desired—simultaneously to eliminate a plurality of problems which can occur with antennas of the prior art:

The antenna has a very stable structure.
The antenna is effectively protected against deposit formation.
A high resistance to pressure is achieved for the antenna by the use of the dielectric material.
The chosen design of the dielectric material introduced into the interior of the antenna assists the focusing of the electromagnetic measuring signals.

Moreover, the widened cavity preferably has the shape of a funnel. Correspondingly fashioned antennas are usually termed horn antennas. In a horn antenna, the inner surface can either be smooth, or it has a certain structure. Horn antennas with a structured inner surface are generally known under the designation of "corrugated horn antennas". The purpose of the structured inner surface of the antenna is to impress on the measuring signals a phase shift dimensioned such that a substantially plane wavefront is emitted at the antenna output.

The widened cavity of the antenna is, however, not limited to the shape of a funnel, as is customary with horn antennas. For example, the widened cavity can also have the shape of a parabolic mirror, or else a cylindrical shape.

Basically, the filling material can be any desired dielectric material. Teflon, sapphire, ceramic or quartz glass, for example, will be applied as filling material.

In accordance with a preferred refinement of the device according to the invention, the outer surface of the filling material is shaped as a lens. The outer surface of the filling material can thus be of convex configuration. Likewise, the outer surface of the filling material can also have the shape of a Fresnel lens.

In order to avoid damage to the filling material during transportation, in the course of installation or dismounting or while storing the antenna, according to an advantageous development of the device according to the invention the highest elevation of the outer surface of the filling material is arranged under the outer edge of the widened cavity of the antenna.

In accordance with an advantageous refinement of the device according to the invention, an additional protective layer is provided which is arranged upstream of the dielectric filling material in the direction of emission. This additional protective layer is preferably used whenever the outer surface of the filling material is structured—in which case it must be considered that a structured outer surface accommodates deposit formation. This protective layer can either be of plane configuration, but it can also have the shape, for example, of a cone turned inside or outside.

The frequency of the high-frequency electromagnetic measuring signals is preferably higher than 30 GHz. The antennas can be of relatively small configuration if the frequency is of this order of magnitude. Deposit formation is highly problematical precisely in the case of small antennas, since the internal dimensions of the waveguide must be small by comparison with the size of drops of condensate or particles of dirt which make up the deposit. This means that frequently as much as a single drop or single particle of dirt suffices to block the waveguide and cause very strong interfering reflections. If the antenna cavity is filled up according to the invention with a dielectric, the waveguide and all the antenna regions with small internal dimensions are protected effectively against condensate and other forms of contamination. Deposit formation is less critical on the relatively large outer surface of the dielectric, since individual drops or particles do not cover the entire diameter and can drop off again more easily.

As already mentioned at an earlier juncture, it is possible in addition to achieve a focusing effect through the surface shape and surface structure of the filling material: the region in which the measuring signals impinge on the surface of the filling material is precisely defined, as a result of which interference signals, that is to say measuring signals which are reflected not at the surface of the filling material, but at any built-in components in the container or at the container wall, become less likely.

In accordance with a preferred development of the device according to the invention, the transceiver unit guides the electromagnetic measuring signals through the rear wall or through the side wall of the waveguide into the antenna or out of the antenna.

A solution which is particularly advantageous because it is cost-effective provides that the dielectric filling material fills up only a subregion of the waveguide, said subregion adjoining the widened cavity of the antenna. As an example, an antenna may be named here in the case of which the length of the waveguide turns out to be relatively large for reasons of temperature coupling between filling level sensor and process/process medium. If the filling material fills up the cavity of the antenna only partially, it is particularly favorable when the end region of the dielectric filling material, which extends into the waveguide, is shaped so as to optimize the coupling of electromagnetic measuring signals at the air/filling material transition.

DESCRIPTION OF THE PREFERRED EMBODIMENTS

Figure 1:
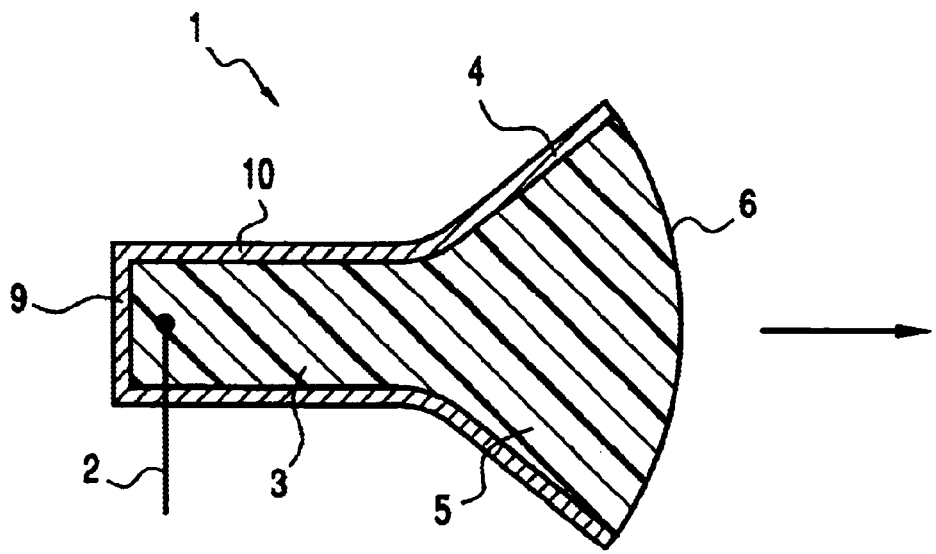
FIG. 1 shows a schematic of a first embodiment of the device according to the invention.

A schematic of a first embodiment of the device according to the invention is shown in FIG. 1. The antenna 1 consists of a waveguide 3, which is adjoined in the direction of emission of the electromagnetic measuring signals by a widened cavity 4. Moreover, in the case illustrated the antenna 1 is a horn antenna with a circular cross section.

The electromagnetic measuring signals are coupled into the antenna 1 laterally via the transceiver unit 2 or coupled out laterally from the antenna 1. The signal-generating unit and the control/evaluation unit are illustrated as a combined unit 12 in FIGS. 3 and 4.

The interior of the waveguide 3 and of the widened cavity 4 is filled up with a dielectric filling material 5. This dielectric filling material 5 protects the antenna 1 against deposit formation and damage. Depending on the embodiment, the dielectric filling material 5 can, however, also fulfil other functions: it lends the antenna 1 a high level of stability; it creates a pressure-resistant protective cover for the antenna 1, and/or it serves the purpose of optimally focusing the measuring signals.

The outer surface 6 of the dielectric material 5 is of convex shape in the case shown for the purpose of focusing the measuring signals. Other configurations of the outer surface are possible, of course. Mention may be made at this juncture once again, by way of example, of the construction of the outer surface as a Fresnel lens.

Figure 2:
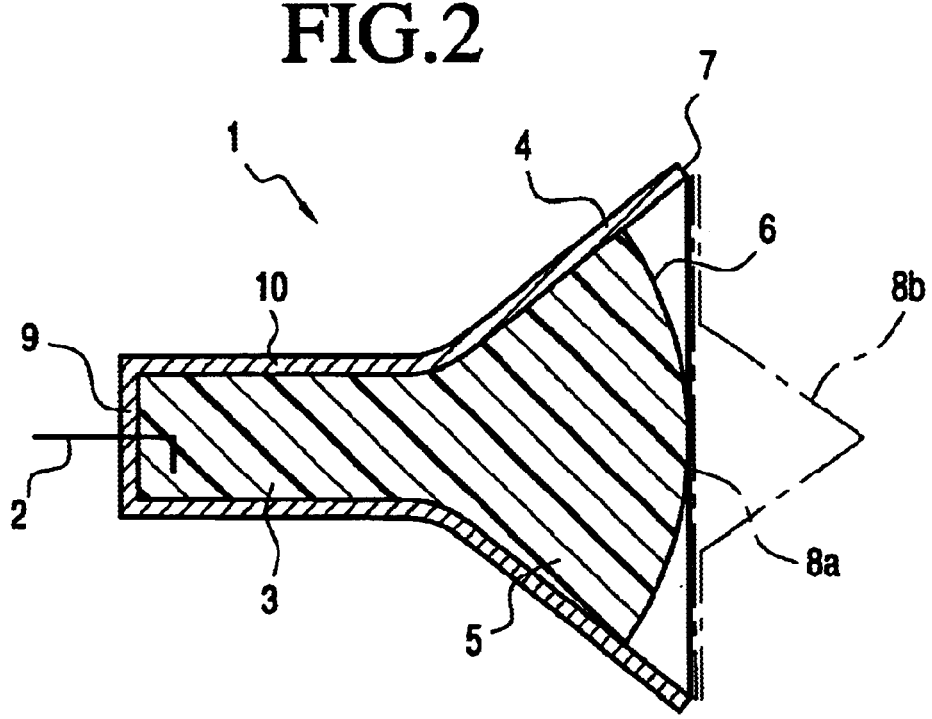
FIG. 2 shows a schematic of a second embodiment of the device according to the invention.

A schematic of a second embodiment of the device according to the invention is to be seen in FIG. 2. Once again, the antenna 1 consists of a waveguide 3 and a widened cavity 4 which directly adjoins the waveguide 3. The measuring signals are coupled in and out via a transceiver unit 2, which is guided through the rear wall 9 of the antenna 1. The waveguide 3 and the widened cavity 4 are virtually completely filled up with the dielectric filling material. The outer surface 6 of the dielectric filling material 5 has a convex shape in the case shown, the highest elevation of the dielectric filling material 5 coming to lie under the outer edge 7 of the widened cavity 4 This configuration protects the outer surface 6 of the dielectric material 5 very effectively against damage in the case of transportation, of installation and dismounting, and of storage of the antenna 1.

If the outer surface 6 of the dielectric material 5 is structured—for example in the shape of a Fresnel lens—it is advantageous when an additional protective layer 8a; 8b is further provided downstream of the outer surface 6—in the direction of emission of the electromagnetic measuring signals. The protective layer 8a is a flat disc which is fastened as a separate part in the region of the outer edge 7 of the antenna 1. By contrast, the protective layer 8b is a turned out cone, and this in turn counteracts the deposit formation excellently. Of course, another possibility is a protective layer which has a conical indentation, for example.

Moreover, it goes without saying that the antenna 1 can have both a circular and an angular cross section.

Figure 3:
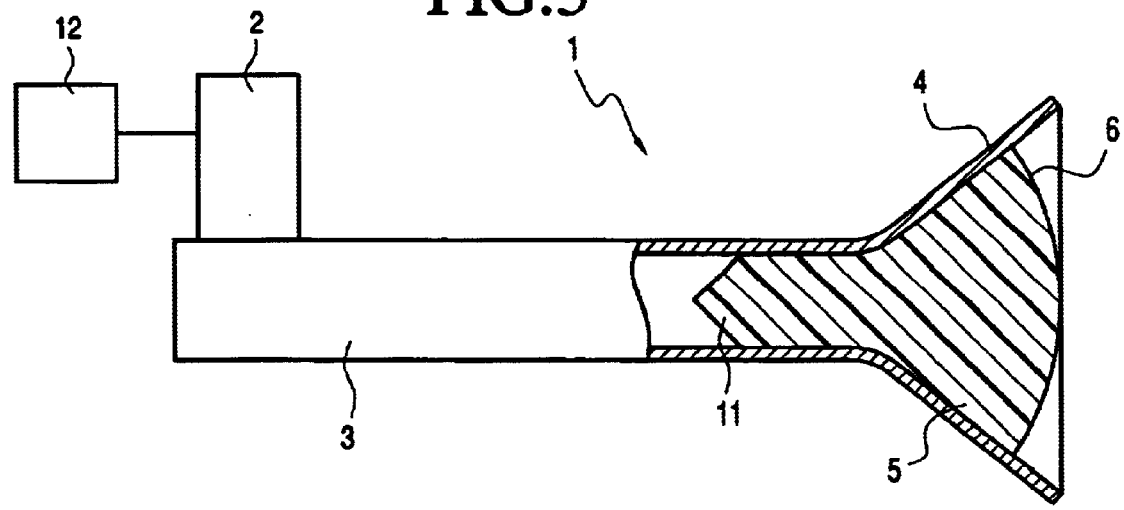
FIG. 3 shows a schematic of a third embodiment of the device according to the invention.
Figure 4:
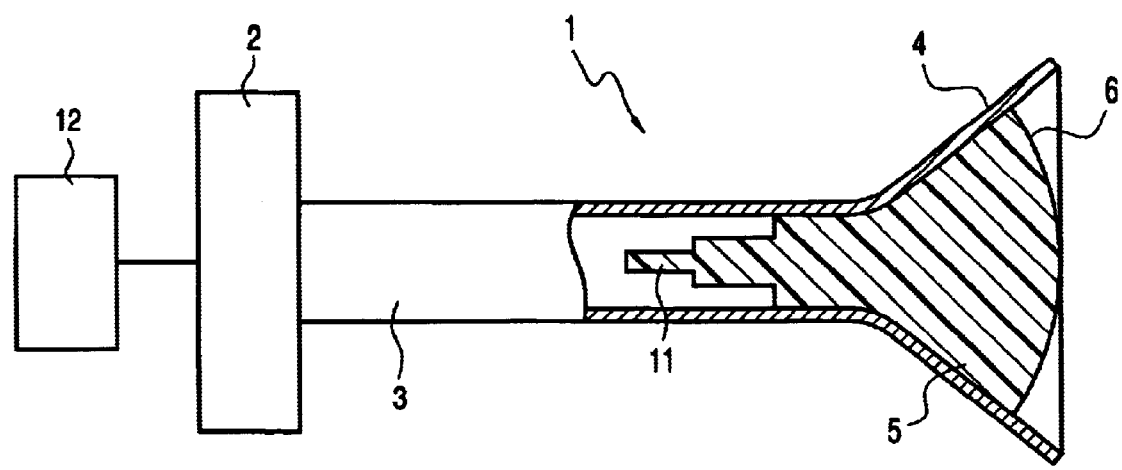
FIG. 4 shows a schematic of a fourth embodiment of the device according to the invention.

FIGS. 3 and 4 show schematics of a third and, respectively, fourth embodiment of the device according to the invention. Whereas in the case of the embodiment shown in FIG. 3 the transceiver unit 2 guides the measuring signals through the side wall 9 into the waveguide 3 or out of the waveguide 3, the measuring signals are coupled in or coupled out through the rear wall 9 in the case of the embodiment shown in FIG. 4. A common feature of the two embodiments (FIG. 3, FIG. 4) is that the waveguide 3 is of relatively long dimension. Such an embodiment has certain advantages when high-frequency measuring signals are used. In this case, high-frequency means that the frequency is higher than approximately 30 GHz.

Particularly in the case of an antenna 1 of such a configuration, it is not required for the dielectric material 5 to fill up the waveguide 3 and the widened cavity 4 completely. Thus, it suffices when the dielectric filling material 5 fills up the widened cavity 4 and the region of the waveguide 3 adjoining the widened cavity 4. The fact that the appropriate end region 11 of the dielectric filling material 5 has a particular shape results in optimized matching upon transition of the measuring signals from the region of the waveguide 3 free from filling material into the region of the waveguide 3 in which the filling material 5 is arranged. Moreover, a conical or pyramidal transition region has proved the best in this context.

List of Reference Numerals

1 Antenna
2 Transceiver unit
3 Waveguide
4 Widened cavity
5 Dielectric filling material
6 Outer surface
7 Outer surface
8a Additional protective layer
8b Additional protective layer
9 Rear wall
10 Side wall
11 End region of the dielectric filling material

What is claimed is:

1. A device for determining the filling level of a filling material in a container, the filling material defining a surface, the device comprising:

signal-generating unit, which generates electromagnetic measuring signals; an antenna;

a transceiver unit, which emits the measuring signals via said antenna in the direction of the surface of the filling material and which receives echo signals reflected from the surface of the filling material; and an evaluation unit which determines the filling level in the container from the propagation time of the measuring signals, wherein:

said antenna comprises a waveguide which widens in the direction of emission into a cavity of a defined shape;

at least one dielectric filling material which at least partially fills up said waveguide, and which virtually completely fills up said widened cavity; and said dielectric filling material defines an outer surface which is shaped as a lens.

2. The device as claimed in claim 1, wherein:

said outer surface of said dielectric filling material is of convex configuration.

3. The device as claimed in claim 1, wherein:

said outer surface of said dielectric filling material has the shape of a Fresnel lens.

4. The device as claimed in claim 2, wherein:

the highest elevation of said outer surface of said dielectric filling material is arranged under the outer edge of said widened cavity.

5. The device as claimed in claim 2, further comprising:

an additional protective layer which is arranged upstream of said dielectric filling material in the direction of emission.

6. The device as claimed in claim 1, wherein:

the frequency of the electromagnetic measuring signals is higher than 30 GHz.

7. The device as claimed in claim 1, wherein:

said transceiver unit guides the electromagnetic measuring signals through the rear wall of said waveguide into or out of said antenna.

8. The device as claimed in claim 1, wherein:

said transceiver unit guides the electromagnetic measuring signals through a side wall of said waveguide into or out of said antenna.

9. The device as claimed in claim 1, wherein:

said dielectric filling material fills up only a subregion of said waveguide, the subregion adjoining said widened cavity of said antenna.

10. The device as claimed in claim 9, wherein:

an end region of said dielectric filling material, which extends into said waveguide, is shaped so as to optimize the coupling of the electromagnetic measuring signals into said dielectric filling material.

* * * * *